(12) United States Patent
Niedner et al.

(10) Patent No.: US 6,497,945 B1
(45) Date of Patent: Dec. 24, 2002

(54) FOAMLIKE MINERAL BUILDING AND STRUCTURAL MATERIAL AS WELL AS A METHOD OF PRODUCING A MINERAL FOAM AND AN APPARATUS FOR CARRYING OUT THIS METHOD

(75) Inventors: Peter Niedner, Max-Obermayr-Weg 3, 83707 Bad Wiessee (DE); Matthias Franke, Moritzburg (DE); Kathrin Choyna, Freiberg (DE)

(73) Assignee: Peter Niedner, Bad Wiessee (DE)

( * ) Notice: Subject to any disclaimer, the term of this patent is extended or adjusted under 35 U.S.C. 154(b) by 0 days.

(21) Appl. No.: 09/517,388

(22) Filed: Mar. 2, 2000

(30) Foreign Application Priority Data

Mar. 2, 1999 (DE) .......................................... 199 09 077

(51) Int. Cl.[7] .................................................. B32B 3/26
(52) U.S. Cl. ............................... 428/304.4; 428/312.6; 428/314.4; 428/315.5; 428/317.9
(58) Field of Search ........................... 428/312.6, 314.4, 428/313.9, 317.9, 315.5, 71, 304.4

(56) References Cited

U.S. PATENT DOCUMENTS

| | | | |
|---|---|---|---|
| 3,850,650 A | * | 11/1974 | Von Bonin et al. |
| 4,084,980 A | * | 4/1978 | Motoki |
| 4,116,703 A | * | 9/1978 | Stempin et al. |
| 4,171,985 A | * | 10/1979 | Motoki et al. |
| 4,462,835 A | * | 7/1984 | Car |
| 4,483,713 A | * | 11/1984 | Motoki |
| 4,867,791 A | * | 9/1989 | Jaklin |
| 5,190,104 A | * | 3/1993 | Shu |
| 5,356,716 A | * | 10/1994 | Patel |
| 5,372,640 A | * | 12/1994 | Schwarz et al. |
| 5,385,785 A | * | 1/1995 | Lovell |
| 5,989,330 A | * | 11/1999 | Semler et al. |

FOREIGN PATENT DOCUMENTS

| | | | |
|---|---|---|---|
| BR | 7508401 | | 7/1977 |
| CA | 939393 | | 2/1974 |
| DE | 2055283 | | 3/1979 |
| JP | 49014520 | | 2/1974 |
| JP | 50002396 | | 1/1975 |
| JP | 50044217 | | 4/1975 |
| JP | 53012924 A | * | 2/1978 |
| JP | 53142020 A | * | 12/1978 |

(List continued on next page.)

OTHER PUBLICATIONS

6001 Chemical Abstract, p. 329, 110 (1989) Apr. 17, No. 8, Columbus, Ohio, US.

6001 Chemical Abstracts, 88 (1978) Jan. 9, No. 2, Columbus, Ohio, US.

6001 Chemical Abstracts, 84 (1976) Mar. 22, No. 12, Colombus, Ohio, US.

Database WPI, Section CH, Week 197534, Derwent Publications Ltd., London, GB.

*Primary Examiner*—M. Alexander Elve
*Assistant Examiner*—Kiley Stoner
(74) *Attorney, Agent, or Firm*—Marshall, Gerstein & Borun

(57) ABSTRACT

The present invention relates to a foamlike mineral building and structural material based on a substantially uniformly foamed alkali-silicate and/or ammonium-silicate matrix encompassing an open and/or closed porous structure. In addition, the present invention relates to a method of producing a foamlike mineral building and structural material comprising the following steps: adjusting the water content of the alkali-silicate and/or ammonium-silicate starting material to a specific value, and foaming the pretreated alkali-silicate and/or ammonium-silicate material, and to an apparatus for carrying out the method which comprises: a conditioner for adjusting the water content of the alkali-silicate and/or ammonium-silicate starting material and a heating means for the foaming step.

25 Claims, 9 Drawing Sheets

FOREIGN PATENT DOCUMENTS

| | | | |
|---|---|---|---|
| JP | 53142416 A | * | 12/1978 |
| JP | 55059271 A | * | 5/1980 |
| JP | 55113654 A | * | 9/1980 |
| JP | 358057492 A | * | 4/1983 |
| JP | 58140363 A | * | 8/1983 |
| JP | 58190854 A | * | 11/1983 |
| JP | 58199763 A | * | 11/1983 |
| JP | 63242977 | | 10/1988 |
| JP | 02107581 A | * | 4/1990 |
| JP | 02265775 A | * | 10/1990 |

* cited by examiner

FOAMLIKE MINERAL BUILDING AND STRUCTURAL MATERIAL AS WELL AS A METHOD OF PRODUCING A MINERAL FOAM AND AN APPARATUS FOR CARRYING OUT THIS METHOD

FIELD OF THE INVENTION

The present invention relates to a foamlike mineral building and structural material produced from an alkali-silicate and/or ammonium-silicate matrix, a method of producing the mineral foam as well as an apparatus for carrying out the method according to the present invention.

BACKGROUND OF INVENTION

Various mineral foams are already known. A glass foam granulate is, for example, known, which is produced from glass powder having added thereto an expanding agent which releases a propellant at high temperatures. Glass foam granulates are used for many purposes, e.g. as light-weight aggregate for mortars and plasters. They are, however, many times heavier than plastic foams and because of the higher thermal conduction they are suitable to be used as an insulating material only to a limited extent.

Furthermore, it has already been suggested to use, in addition to glass powder also other substances, such as crushed rocks, silt and clay as raw materials for mineral foams. The resultant products are dimensionally stable up to 1000° C. and pressure resistant, but they are not suitable to be used as insulating materials either.

Water glass is known as a raw material in the field of civil engineering, e.g. also as an accompanying raw material for the production of mineral foams. In the case of the known mineral foams, it is common practice to add water glass, e.g. for improving the opening up of the raw materials. Water glass is here, however, added and used as an auxiliary agent which does not contribute much to the characteristic and the quality of the mineral foam. Water glass loses its reactivity at the high expanding temperatures of 700° C.–1200° C. which have been necessary up to now.

Furthermore, water glass is used as a binding agent. Water glass does, however, not act as a foaming agent in these cases.

It is already known to use water glass as a foaming agent for fire-retarding plates, fire-retarding fillers and fire-retarding paints. The water-glass property of expanding in case of fire spontaneously and in an uncontrolled manner under the influence of high temperatures is here utilized for these industrial fire-precaution products.

The water content of known fire-precaution products is between 20% by weight and 40% by weight in relation to the total recipe, including fillers.

The use of commercially available alkali silicates having a water content of more than 40% by weight results, due to the high water content, in explosive, uncontrolled foaming in response to the energy input from outside which will normally take place. As a result, large-pored and non-homogeneous products are formed in which the smaller water vapour bubbles combine and form larger bubbles. The foams formed from the molecular water in the case of fire by the above-mentioned fire-precaution products have, as is generally known, no compressive strength and are already destroyed when subjected to minimal external influences. They are only suitable for short-time fire protection.

Altough alkali silicates, such as sodium, potassium or ammonium silicates, are used in a broad range of industrial applications as binding agents, adhesive agents, detergents, etc., it has up to now been impossible to produce from a water-glass raw material industrial foams of uniformly good quality, e.g. for the purpose of thermal insulation, light-weight construction and other applications.

SUMMARY OF THE INVENTION

It is the object of the present invention to provide an improved building and structural material for high-quality industrial products for the first time.

This object is achieved by a foamlike mineral building and structural material based on a substantially uniformly foamed alkali-silicate and/or ammonium-silicate matrix encompassing an open and/or closed porous structure.

Preferred embodiments of the foam according to the present invention are described in subclaims 2 to 13.

The present invention additionally provides a method of producing foamlike mineral building and structural materials, said method comprising the following steps, adjusting the water content of an alkali-silicate and/or ammonium-silicate starting material to a specific value, and foaming the pretreated alkali-silicate and/or ammonium-silicate material.

The method according to the present invention permits the production of high-quality and uniformly fine-pored foams with an alkali-silicate matrix, which have a very low thermal conductivity and a good compressive strength. The present invention permits in particular the use of commercially available raw materials, e.g. water glass, i.e. materials which, up to now, have not been suitable to be used as starting materials for mineral building and structural materials. Since commercially available products can be used as raw materials, the method according to the present invention is also advantageous with regard to the costs entailed.

The adjustment of the water content according to the present invention is preferably achieved by drying the alkali-silicate and/or ammonium-silicate matrix material. It proved to be particularly advantageous when the alkali-silicate and/or ammonium-silicate matrix material has, after the drying step, a water content of less than 20% by weight, but more than 5% by weight, in relation to the alkali-silicate and/or ammonium-silicate matrix material. Particularly good results are achieved with a residual water content of 15% by weight to 10% by weight.

Drying can be carried out in two different ways according to the present invention. One way is drying and foaming in one process in two temperature stages, the main raw material component being a slightly or non-predehydrated alkali-silicate and/or ammonium-silicate matrix and the removal of water taking place in the first stage of the process by energy input at temperatures of up to 110° C., preferably, however, at temperatures between 80° C. and 90° C. The slightly or non-predehydrated alkali-silicate and/or ammonium-silicate matrix is here, prior to the drying step, a highly viscous, aqueous solution whose consistency may vary between still flowable and already solidified and which can also serve as an enveloping material for the dissolved water and, if desired, for additive substances.

The other way is the production by applying temperature and pressure to an alkali-silicate and/or ammonium-silicate matrix bed which is used as raw material in the form of a dried or a calcined powder or a granular material. An addition of water and/or an aqueous solution and/or an aqueous suspension and/or an alkali-silicate and/or ammonium-silicate liquid may here be expedient under certain circumstances so as to be able to produce a matrix having precisely the consistency desired. The semifinished product produced in both ways is a highly viscous, from pasty to solidified, compact solution having the desired water content in the range between 20% by weight and 5% by weight.

Furthermore, it turned out that the drying step can be carried out in an advantageous manner making use of microwaves at temperatures of up to 100° C., preferably at temperatures between 80° C. and 90° C.

The use of microwave heating permits the intensity and the duration of the energy input to be dosed in a very simple manner and to guarantee simultaneously a careful treatment of the starting material.

Microwave heating can subsequently also be used for foaming the pretreated starting material according to the present invention.

According to the present invention, a mineral foam can be produced from the alkali-silicate and/or ammonium-silicate matrix starting material, the volume of said mineral foam being, according to requirements, 10 to 30 times as large as the initial volume. Depending on the intensity and the duration of energy input, a product will be obtained, which is either closed-pored to a large extent when energy is supplied carefully or open-pored and highly disperse when the energy input is of a more intensive nature.

It follows that the method according to the present invention permits the production of both close-pored and open-pored products for the first time, and, in addition, it is possible to produce both kinds of products with different bulk densities in the same foaming system by changing the process parameters only slightly.

The open-pored foam produced according to the present invention comprises up to 97% open pores and consists of a large number of amorphous and crystalline, irregularly arranged hollow microspheres, hollow spherical microshells, microplates and/or microrods. This results in a high air diffusibility, which is of interest in the case of insulating materials and, especially, in the case of sound absorption materials.

According to a further aspect, the present invention provides an apparatus for carrying out the method according to the present invention, said apparatus comprising: a conditioner for adjusting the water content of the alkali-silicate and/or ammonium-silicate starting material and a heating means for the foaming step.

The foam produced according to the present invention is, on the one hand, a material for building and structural applications in the case of which a very long service life is desired or necessary. On the other hand, it is also a packaging material, like plastic foams, for which a short service life suffices and in the case of which a long-lasting chemical resistance would be disadvantageous and even ecologially precarious.

The present invention offers the following solutions for the two different requirements which have to be fulfilled by the material:

In the case of products which have to satisfy long service life requirements non-stabilized water glass fails to fulfil the requirements in question. Due to the hygroscopic properties of the alkali-silicate and/or ammonium-silicate matrix material, the foam produced in this way would not be resistant to atmoshpheric moisture in the long run without an additional treatment. When a long service life is desired, the foam is therefore durably stabilized by adding up to 20% by weight of calcium or zinc or magnesium or ammonium or aluminium hydroxide or oxide or natrium compounds or silica or alumina gels or sols according to a further feature of the present invention.

The thus stabilized foam—no matter whether it is of the open-pore or of the closed-pore type—is an ideal insulating material because it combines excellent properties. It combines the respective good properties of the known plastic foams (thermal insulation, bulk density) with the good properties of glass and plastic foams (incombustibility, open pores, ecology) without showing the disadvantages of these foams.

The resultant mineral foam has the following properties, among others:

| | |
|---|---|
| bulk density | 0.04–0.10 g/cm$^3$, |
| compressive strength | 0.01–0.50 MPa, |
| thermal conductivity | 0.03–0.10 W/(mK) |

When a short service life of the products in question is desired, especially for packages, the hygroscopic properties of the alkali-silicate and/or ammonium-silicate matrix material are utilized for ecological recycling according to the present invention. Used packages are dissolved in hot water or by means of vapour and converted into an alkali-silicate and/or ammonium-silicate matrix according to the present invention; if necessary, they are reduced in size previously. The previous packaging material is in this way reduced to a volume corresponding to a small percentage of its foam volume and can be made available to the packaging material manufacturer as a raw material in an expedient manner according to the present invention. Since the alkali-silicate and/or ammonium-silicate matrix is destroyed neither when the package is being produced nor when it is being dissolved, this recycling process can be repeated as often as desired.

If the material according to the present invention is intended to be used as a packaging material, a ratio of $SiO_2$ to the alkali or ammonium component of less than 2.5 has proved to be particularly advantageous in the alkali-silicate and/or ammonium-silicate matrix.

For producing highly stabilized materials, a ratio of $SiO_2$ to the alkali or ammonium component of more than 2 proved to be particularly advantageous in the alkali-silicate and/or ammonium-silicate matrix.

The properties of the mineral building and structural materials produced in accordance with the present invention can be varied and improved by adding additive substances, in particular reinforcing fibres. The compressive strength, for example, can be increased up to 10 times by adding 5% by weight of glass fibres or of $SiO_2$ fibres.

The reasons for the good properties of the foamlike mineral building and structural material according to the present invention, which, taken together, surprise the person skilled in the art, can be explained as follows:

as far as thermal insulation and strength are concerned, a low bulk density in combination with very uniformly distributed microcaverns or micropores are optimal. Up to now, it has not been possible to produce such mineral foams by the hitherto known technologies, since solids, such a oxides, carbonates, carbon, SiC, etc., are used as expanding agents when the mineral foams are being expanded. The expanding agents have a grain size in the range of from 5–63 microns and at the expanding temperatures employed, which are between 600° C. and 1200° C., depending on the mixture of substances used, they release substantial amounts of a hot propellant at a single location and produce correspondingly large pores at the location in question. Large pores are, however, undesirable for good insulating properties.

The hitherto unachieved ideal of mineral foam technology aims at dispersing the structural matrix as well as the foaming agent as finely as possible already in the starting material. According to the present invention, this is achieved by a molecular distribution, i.e. by a solution of all the relevant reaction partners. In addition, this is achieved by adjusting the control of the foaming process in such a way that the molecular distribution of the resultant propellant bubbles is preserved as long as possible and reappears in the product in the form of fine pores. It is impossible to produce an equivalent product from mixtures of solids.

By means of the present invention, this optimum in the field of mineral foam technology could be realized for the first time. This is also proved by the fact that a foam with very fine pores and with an extremely low bulk density could be formed, here with water vapour as a propellant, in the field of foaming technology for the first time.

In the case of known methods for producing mineral foams energy is supplied from outside. Depending on the grain size and the grain distribution of the expanding agent in the raw material, small to medium-sized propellant bubbles are formed, which are held in position by the continuous matrix consisting of the molten mineral which has a honeylike consistency. If the molten mineral is, however, locally super-heated, this will simultaneously cause an increase in the partial gas pressure and a reduction of the viscosity of the molten material at the same location. The result is that gas bubbles are mobilized and that small bubbles combine and form large bubbles which will deteriorate the quality of the product.

When the known methods are used, local superheating of the molten material cannot be avoided, since the heat acts from outside on the molten material, which, in turn, already acts as an insulating material by forming a foam at the same location, said insulating material conducting only little heat inwards. The result in the case of this technology is an unavoidable formation of large pores by the so-called "boiling up" of the molten material. Large pores are, however, undesirable.

According to the present invention, energy is supplied to the alkali-silicate matrix by applying the microwave technology by means of which the above-described disadvantages of the former technology have been eliminated completely.

Making use of this part of the invention, precisely dosed amounts of energy can simultaneously be supplied to each individual water molecule of the matrix when mineral foams are being produced.

Since part of the solution water had already been removed from the alkali-silicate and/or ammonium-silicate matrix according to the present invention before the expanding process was started, the amount of water vapour developing within the molten material as a result of the effectively controllable energy input by the microwave unit will not exceed the amount aimed-at for the foaming process and desired for the respective quality of the product. An undesired combination of water vapour bubbles does not take place.

The method according to the present invention offers the additional advantage that, for the first time in the field of mineral-foam production technology, the transport of energy takes place from the expanding agent to the solid and not vice versa, as in the case of the prior art. As a result, the expanding agent will liquefy the solid matrix according to the present invention, and the solid matrix need not cause the expanding agent to react by transferring energy thereto. Making use of the present invention, the energy transport paths will, in addition, be shorter by order of magnitude in comparison with the prior art. Whereas only distances in the range of half the distance between the water molecules have to be overcome for completely heating the matrix when the present invention is used, the energy transport paths which have to be overcome e.g. in the conventional production of foam glass blocks may be as large as 20 cm. This is one of the reasons for the very short process times of the method according to the present invention, another reason being the following physical connection: solution water, microwave heating, trapped water vapour and the matrix cooperate thus forming an efficient theremodynamic system after the heat-pipe principle, which is characterized by very high heat-transport and heat-transfer values. According to the present invention, the heat-transport paths as well as the heat transfers are of such a nature that the physically optimal energy transfer is realized. This permits a temperature gradient in the microsystem which tends towards zero, whereby an optimum reaction time and foam quality will be achieved.

Whereas, when water glass is used as a foaming agent, the foams originating from the molecularly distributed water in the case of fire will exist only a short period of time and finally collapse, as has already been described, the concept according to the present invention starts from the assumption that, during the foaming, the concentration of the water vapour bubbles on the one hand and of the alkali-silicate and/or ammonium-silicate matrix on the other must be within the range specified according to the present invention so as to overcome this physical/chemical obstacle and so as to guarantee the formation of a fine-pored, strong, stable foam. Commercially available raw materials do not fulfil this requirement, since, on the one hand, the alkali-silicate glass (broken glass) is free from water and therefore not reactive and, on the other hand, the commercially available alkali-silicate solution (water glass) contains an excessive amount of water for the foam-forming process according to the present invention.

The present invention shows how an alkali-silicate and/or ammonium-silicate matrix fulfilling, for the first time, the preconditions for producing the foam according to the present invention can be produced on the basis of commercially available raw materials by mixing and by partial dehydration.

In this connection, it additionally turned out that it does not suffice to adjust the water content of the alkali-silicate and/or ammonium-silicate matrix within specific limits, but that a very careful temperature input is necessary as well, so as to prevent a locally concentrated formation and/or excessive heating of water-vapour bubbles which would cause damage to the foam structure that is temperature sensitive with respect to the viscosity of the matrix.

According to the present invention, the formation of a foam can, in certain cases, even be effected, in the case of conventional heat supply, by means of radiation heat transfer, convection heat transfer or contact heat transfer, provided that the heat supply is controlled such that certain temperatures cannot be exceeded in the foam. This can especially be achieved in the case of products having little mass and/or small wall thicknesses, especially when fine-grained granulates are used.

A substantial concept representing a further development according to the present invention is, as has already been described, the use of microwaves as an energy carrier. Foam bodies having a comparatively large size can never be heated optimally by conventional heating because, due to the foam formation which begins at the surface of the product, the flow of heat into the interior of the product is limited to such an extent that local heating or temporal overexposure of the layers located close to the surface cannot be avoided.

Hence, foaming is preferably caused by the influence of microwaves on the existing percentage of dissolved water in the alkali-silicate and/or ammonium-silicate matrix. It turned out that this matrix couples more easily and more rapidly than other water-containing accompanying components of the recipe, such as gypsum and other additive substances containing water of crystallization. Hence, the alkali-silicate and/or ammonium-silicate matrix can be foamed, without water-containing accompanying components being dehydrated and decomposed, respectively, at the same time. When microwave heating is used, the expanding effect begins, suprisingly enough, first at the centre of the alkali-silicate and/or ammonium-silicate matrix. This offers the great advantage that the water-vapour bubbles formed in situ remain captured by the matrix surrounding them and have no chance of combining or escaping.

By means of a suitable adjustment of the water content and by precisely dosing the energy input in the alkali-silicate and/or ammonium-silicate matrix with the aid of microwaves, it is even possible to keep the surface temperatures of the foam so low that even softening of the surface will be avoided. This permits e.g. an agglomeration-free and agglutination-free production of bulk materials (granulates) in the form of a heap as well as of shaped parts in molds. In both cases, which are referred to by way of example, the normally employed separating agents can be dispensed with completely. This is a further substantial improvement in comparison with known methods.

The above-described foaming according to the present invention is carried out so carefully that even organic fibres, which have been incorporated into the matrix or applied to the surface thereof as a reinforcing material, are not or only to an insignificant extent thermally damaged. The method according to the present invention even permits the production of sandwich products making use of temperature-sensitive components, such as paper, plastic materials, textiles, etc. because said method permits low foam temperatures with short exposure times. This is a result that is surprising to the person skilled in the art, said result offering him product-design possibilities which have necessitated up to now the use of plastics technology or bonding techniques in a second working cycle.

When higher surface temperatures are desired in the production of foam products, microwave heating and external heat supply may also be used in combination. By purposefully combining the energy flows, it is possible to produce any desired temperature profile across the width of the cross-section of the foam body during the foaming process. It is also possible to obtain an integral foam with higher density/strength at the surface and lower density/strength in the interior thereof by cooling the surfaces and the moulds, respectively. Up to now, it has only been possible to realize these interesting products by means of plastic foams.

By selecting the temperature control, especially by controlling the energy input, in particular in continuous production plants for granulates and for strand-shaped material, it is also possible to influence the temporal temperature development in the product. It turned out that the use of microwaves permits a very good control of the foaming process. It is also possible to establish an optimum connection between the filler (e.g. fibers), solids (such as sandwich panels) etc. and the foam matrix. The improvement of the compressive strength and of other mechanical properties which has been determined in the case of fiber-reinforced foams proves this effect.

In addition, the foaming temperatures according to the present invention are within the range of the polymerization temperatures of thermosetting plastics and elastomers. It is an additional feature of the present invention that thermosetting plastics and polymers are inserted in an unpolymerized condition, e.g. in the form of resin-impregnated semi-finished fabrics or in the form of resin-impregnated paper, surrounded by foam in situ and cured or polymerized.

In the following, the present invention will be explained in detail making reference to the drawing, in which

DETAILED DESCRIPTION OF THE PREFERRED EMBODIMENTS

Figure 1:
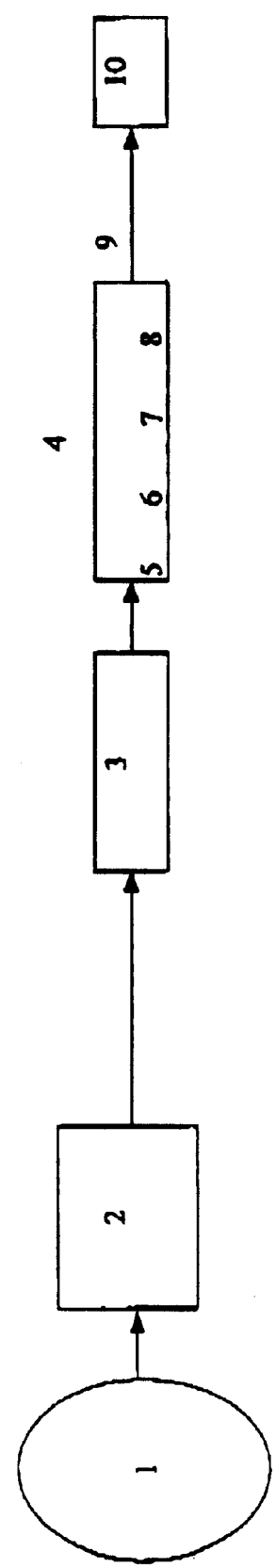
FIG. 1 shows a method of continuously producing the mineral foam according to the present invention.

As can be seen in FIG. 1, the various raw materials for carrying out the method according to the present invention are stored in silos and tanks, partially also in the form of bundles in the raw material storage reservoir 1 and are fed in dosed amounts to the mixing unit 2. In the course of this process, the raw materials are weighed and mixed. Subsequently, the water content of the raw materials is adjusted by drying or mixing and the resultant starting material is cooled or heated, depending on the predetermined batch, until the composition, the water content, the temperature, the viscosity and other parameters correspond to the desired batch and the desired viscosity of the intended alkali-silicate and/or ammonium-silicate matrix, e.g. a sodium alkali-silicate matrix.

The resultant alkali-silicate starting material is supplied from the mixing unit 2 via a feeder to the drier 3. In said feeder 3 a strand-shaped raw product is formed from said alkali-silicate and/or ammonium-silicate matrix starting material. If the drying is performed by means of microwave heating, the raw product formed from the alkali-silicate and/or ammonium-silicate matrix starting material will be provided with an absorbent material on one side or on both sides thereof, preferably, however, on both sides thereof. Suitable absorbent materials are fabrics, paper webs, fleeces, felts, webs of wood chips, cellulose or other biofibers, plates of plaster or cellular concrete, unglazed fine or ordinary ceramics or any other absorbent material.

Subsequently, the resultant raw product coated with an absorbent material is subjected to drying by means of which the water content is adjusted to a specific predetermined value. During the drying step, the water escaping from the raw product is dissipated to the surroundings via the absorbent layer.

In the case of mineral building and structural materials having no compound in common with an absorbent material, a low water content of the alkali-silicate and/or ammonium-silicate matrix is adjusted according to the present invention. Agglutination with the mould and/or of the granular materials can be avoided completely in this case. According to the present invention, water contents of less than 15% by weight, preferably between 13% by weight and 10% by weight, are used for this purpose.

If an agglutination in the sense of a sandwich bond is, however, desired, water contents exceeding 15% by weight will be adjusted. In this case, a very good bond can be achieved between the various product layers. When the necessary water content has been adjusted, the semifinished product is supplied to the foaming oven 4. In this oven, the semifinished product is foamed so as to form the foam according to the present invention. The foaming oven 4 is preferably heated with microwaves, and a plurality of heating zones, e.g. four heating zones 5,6,7,8, is preferably provided; in said heating zones, a controlled energy input is effected.

The foamed alkali-silicate matrix leaves the foaming oven 4 and is cut to the desired size by the shears 9 so as to obtain the finished product 10.

Figure 2:
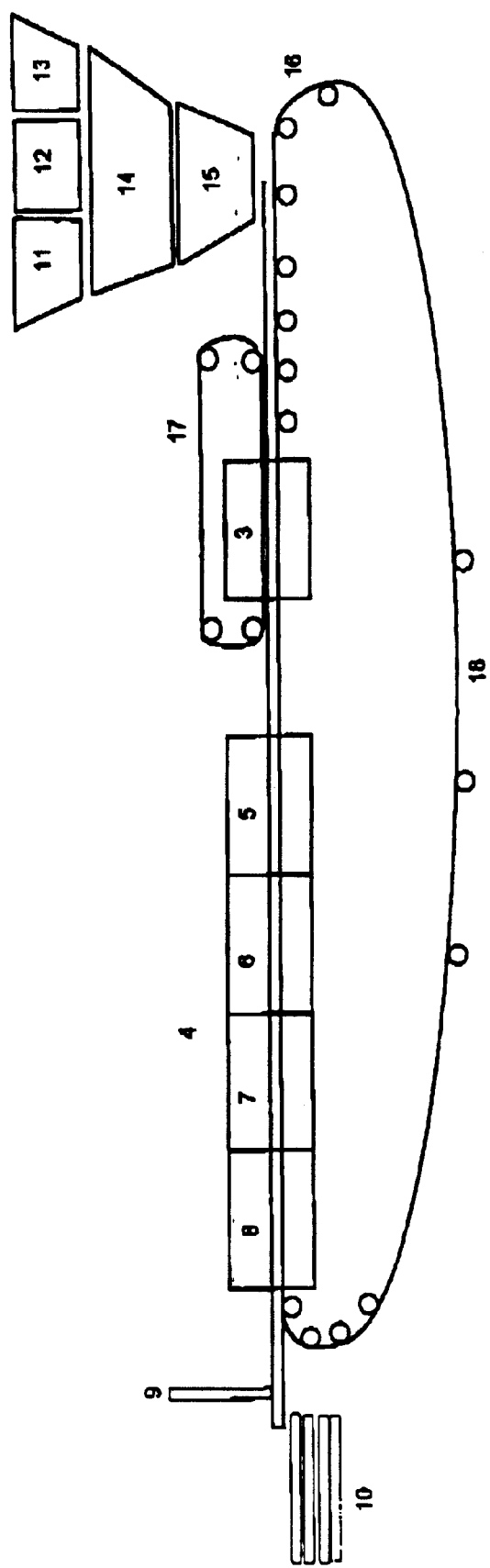
FIG. 2 shows details of the method shown in FIG. 1.

FIG. 2 shows a different embodiment of the method according to the present invention and of the apparatus according to the present invention.

The various batch components are supplied via hoppers 11, 12, 13 to the mixing and homogenization means 14 and, subsequently, to the dosing means 15. The dosing means 15 is here implemented as a mouth piece with a blade/nozzle or with some other shaping means for forming a strand-shaped product, e.g. in a roll mill. The shaped product leaving the dosing means 15 is placed onto a belt 16 which will convey the shaped alkali-silicate and/or ammonium-silicate matrix starting material through the additional method steps. The drier 3 is, in the present case, equipped with a circulating belt 17 consisting of felt or of some other absorbent material which supports the drying process. The absorbent material of the belt 17 is here in direct contact with the shaped product. If belts circulating on both sides should be necessary in individual cases for carrying out the method according to the present invention, the conveyor belt 16 can be subdivided so that it will also be possible to provide a lower belt with belt return, similar to belt 17.

After having been dried, the shaped product is supplied to the foaming oven 4 comprising different heating zones 5, 6, 7 and 8, as has already been described with regard to FIG. 1. The foamed finished product is cut to size by means of shears or a saw or some other cutting tool 9 and is then finally finished by means of a stacking device 10.

Preferably, the conveyor belt is implemented as a circulating belt with belt return 18, the belt return area being also used for cleaning the belt.

Figure 3:
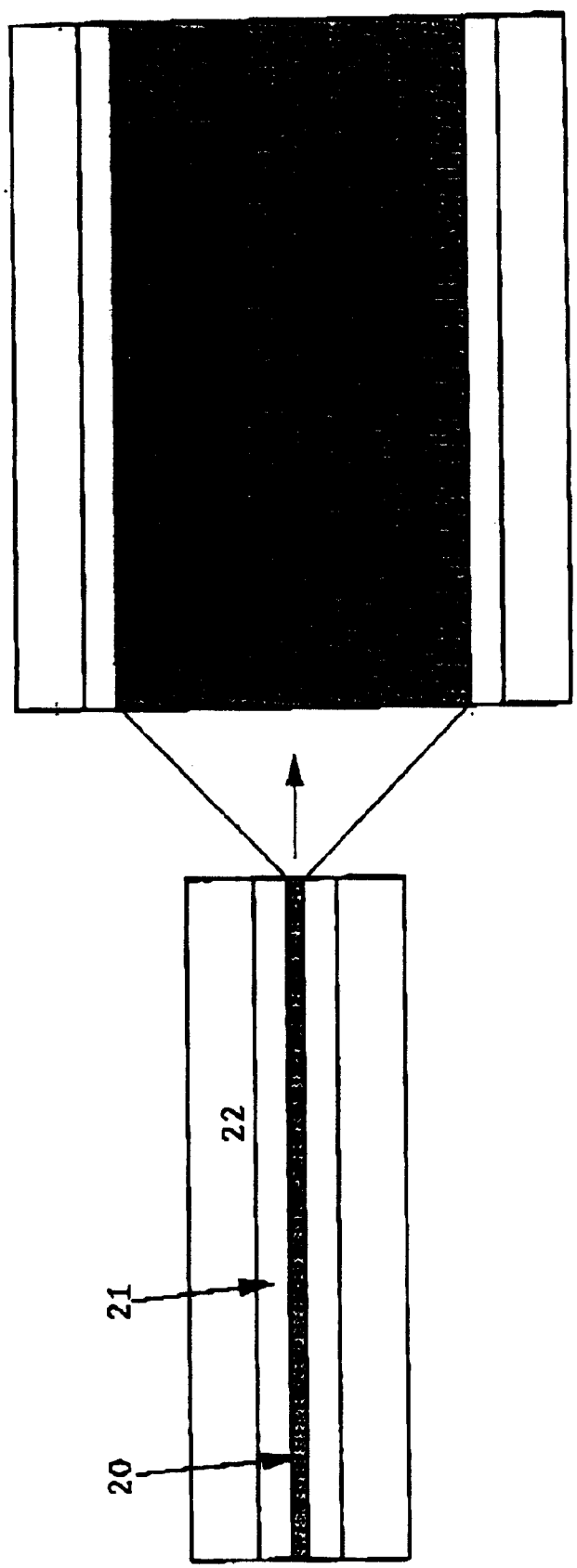
FIG. 3 shows a sandwich product produced in accordance with the method according to the present invention, before and after the foaming step.

FIG. 3 shows a sandwich product, which has been produced according to the present invention, before and after the foaming step. The alkali-silicate and/or ammonium-silicate matrix starting material is here shaped such that a plate-like initial product 20 is obtained and, subsequently, it is provided with plates 21 of absorbent material on both sides, said plates 21 defining the sandwich surface after the foaming step. Such plates 21 may consist of sandwich type plaster, cellular concrete, unglazed fine or ordinary ceramics, glass foam, textile fibers, mineral fibers, bonded wood fibers and other materials. During the foaming step, the sandwich components can be held by additional supporting plates 22 which take up the foaming pressure. The volume of the alkali-silicate matrix material is enlarged 10 to 30 times during the foaming process.

In addition, the connection achieved between the individual sandwich layers during the production method is so good that the methods steps of joining the layers by means of an adhesive, which have normally been employed up to now, can be dispensed with.

Figure 4:
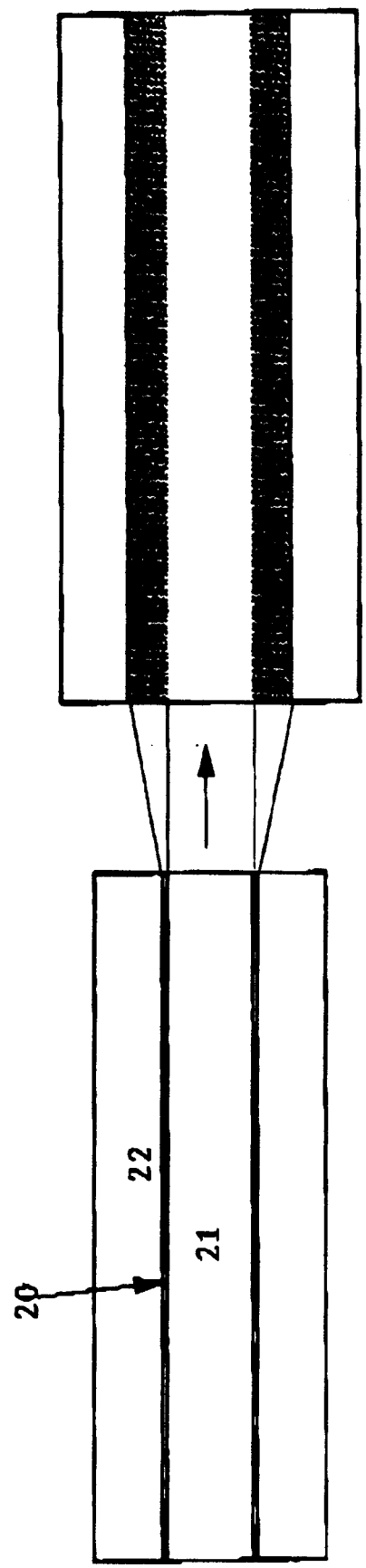
FIG. 4 shows another sandwich product produced in accordance with the method according to the present invention.

In FIG. 4 a further sandwich product produced in accordance with the present invention is shown, in the case of which the absorbent material 21 is not provided as an outer layer but incorporated in the interior of the sandwich as a core having a platelike alkali-silicate and/or ammonium-silicate matrix starting material attached to each of the two outer sides. Materials that are suitable for this purpose are especially plates consisting of mineral fibers. It is, however, also possible to use the materials which have been mentioned with respect to example 3.

The absorbent material defining the core can also be surrounded on four or on all six sides by the alkali-silicate and/or ammonium-silicate matrix starting material.

Figure 5:
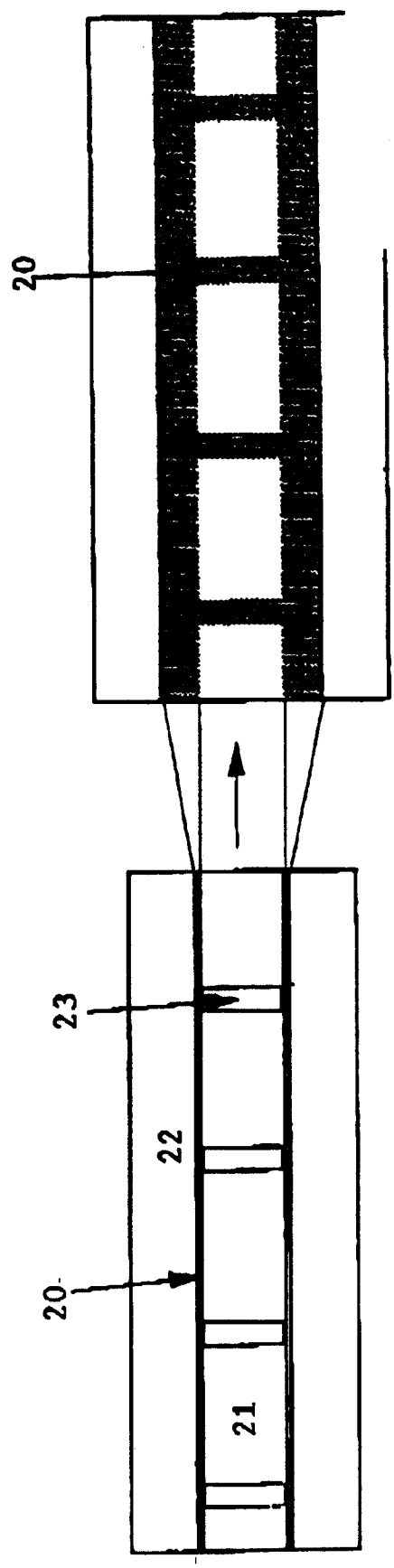
FIG. 5 shows a further sandwich product produced in accordance with the method according to the present invention.

In FIG. 5, a sandwich product produced in accordance with the present invention is shown, which is characterized by an interrupted core 21, e.g. a perforated plate, of absorbent material and which corresponds to the sandwich product according to FIG. 4 as far as the rest of its features is concerned. The material 21 forming the interrupted core is surrounded by the alkali-silicate and/or ammonium-silicate matrix starting material 20 only in the area of the outer surfaces thereof. During the foaming step, said alkali-silicate and/or ammonium-silicate matrix starting material will also expand into the openings 23 within the absorbent material 21 and, finally, it will encompass this material completely.

Figure 6:
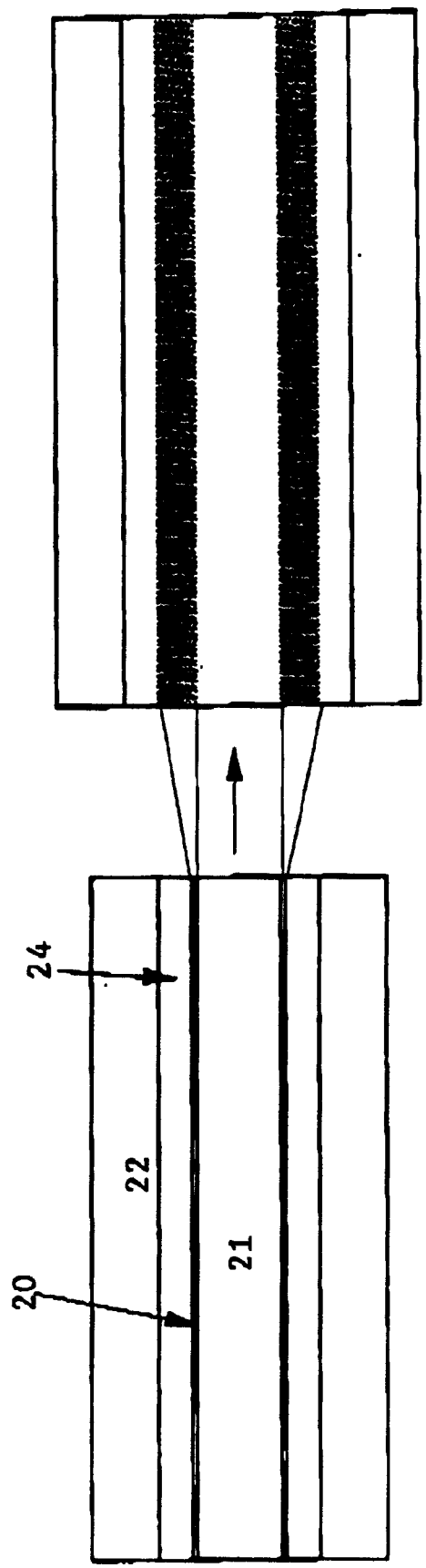
FIG. 6 shows still another sandwich product produced in accordance with the method according to the present invention.

The sandwich product shown in FIG. 6 is provided with surface plates 24 which are not permeable to water, such as glass panes, hard fiberboards, fiber concrete plates, metal plates. According to the present invention, this sandwich product is produced making use of an absorbent core, as has been described with respect to FIGS. 4 and 5, and adding the surface plates 24.

Figure 7:
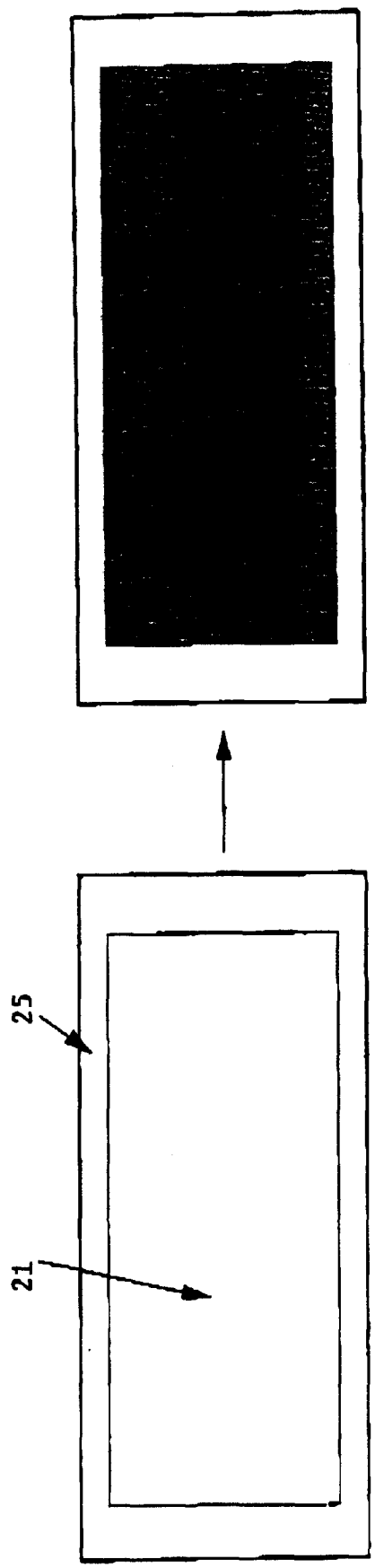
FIG. 7 shows a building stone for walls having the mineral foam according to the present invention introduced therein.

Furthermore, FIG. 7 shows a conventional building stone for walls, e.g. a brick, a cement-bonded stone, etc., which has been filled with the mineral foam according to the present invention. Such building stones for walls have, in practice, webs for static reasons, said webs forming together with the border 25 a hole pattern.

In accordance with the method according to the present invention, each individual hole of the wall building stone has supplied thereto by a dosing device precisely the amount of granular alkali-silicate and/or ammonium-silicate matrix starting material which is required for filling precisely the whole volume with foam. Subsequently, the foaming process is carried out in a microwave oven.

Wall building stones and large-panel elements, respectively, can consist of a plurality of bulk-porous concrete slabs or concrete slabs having a dense structure between which a suitable number of alkali-silicate and/or ammonium-silicate matrix foam layers is arranged. The positive engagement between the concrete slabs is established by means of anchors according to the present invention.

Figure 8:
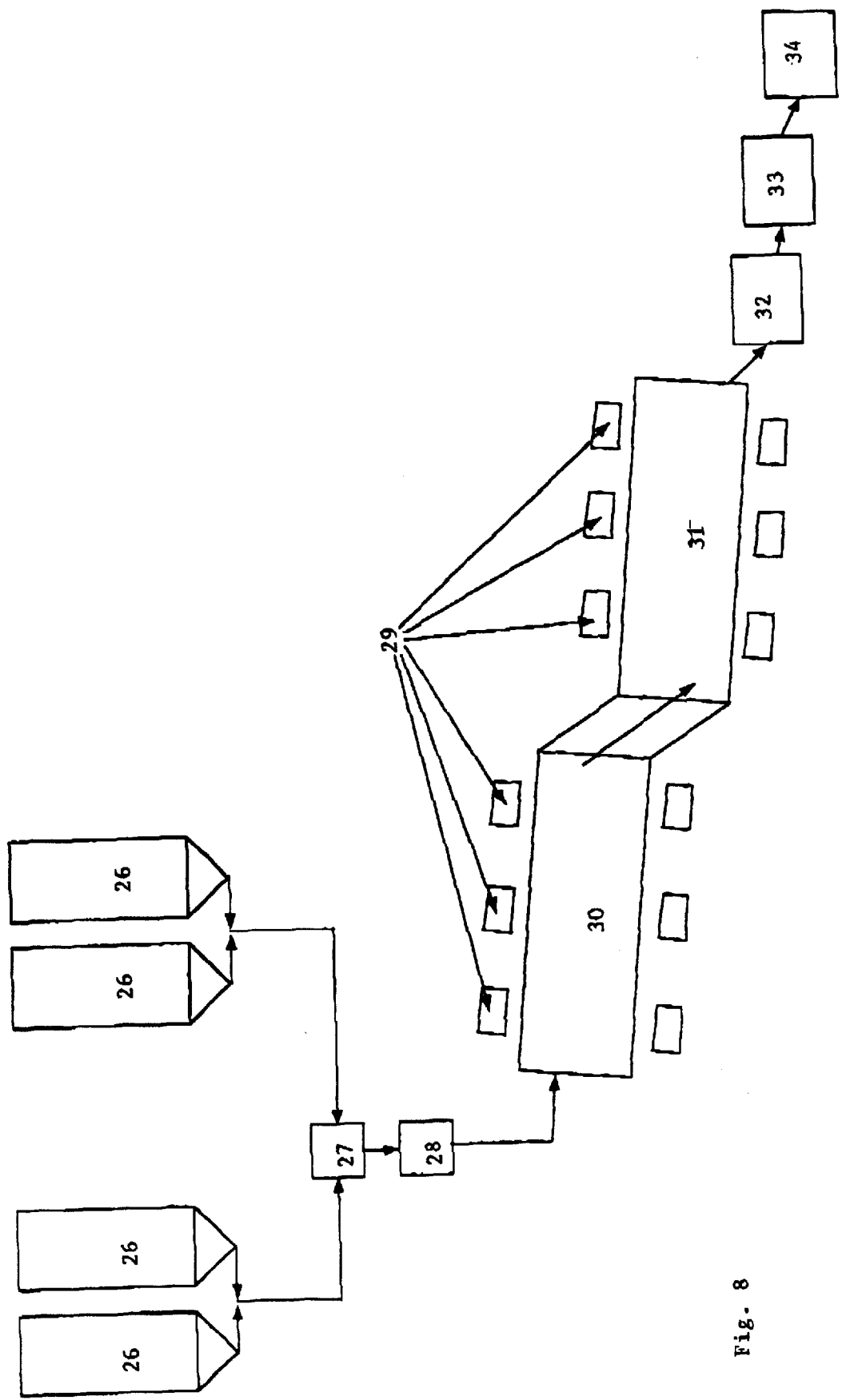
FIG. 8 shows an apparatus according to the present invention for producing a granulate from an alkali-silicate and/or ammonium-silicate matrix.

In addition, a plant for producing mineral building and structural materials in the form of a granular material according to the present invention is shown in detail in FIG. 8.

Raw material components taken from silos 26 are supplied to the mixing unit 27 and combined so as to obtain the alkali-silicate and/or ammonium-silicate matrix starting material. The raw granulate is fed to the oven via a dosing device 28.

The method shown in subdivided into a drying zone 30 and a foaming zone 31 according to the present invention. It is, however, also possible to carry out both methods steps in a single zone, which is then subdivided into a drying section and a foaming section.

The foaming zone 31 can be followed by a cooling zone 32, a screening means 33 and a finishing means 34. The furnaces in the drying and foaming zones are preferably implemented as rotary kilns or pendulum-type troughs. The microwave generators 29 are preferably located outside of the product chamber of the drier 30 and of the oven 31, respectively, and they are arranged such that they are either stationary or that they move together with the drier or the oven. When the energy is supplied by microwave transmitters arranged outside of the product chamber, the construction material of the drier 30 and of the oven 31 will preferably consist of non-metallic materials.

Figure 9:
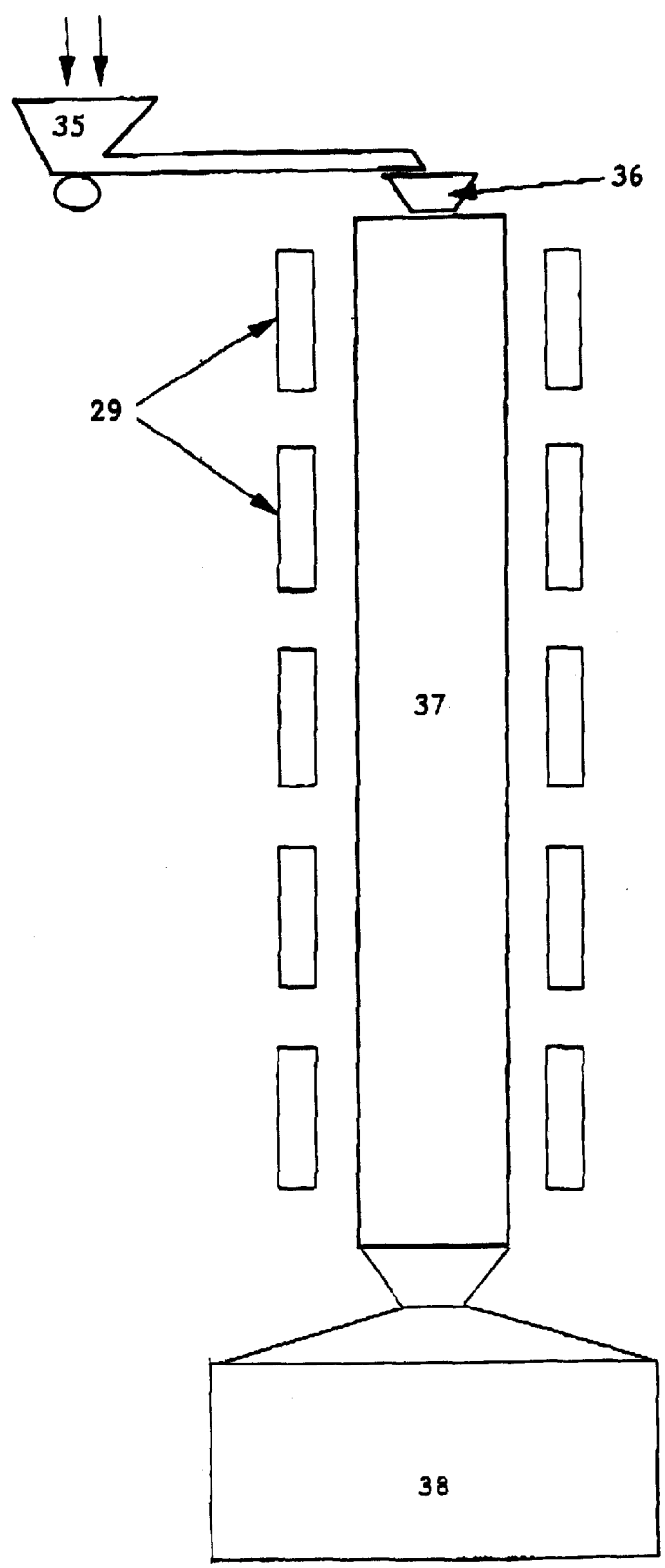
FIG. 9 shows another apparatus according to the present invention for producing a granulate from an alkali-silicate and/or ammonium-silicate matrix.

A further embodiment of a plant for producing granular material consisting of an alkali-silicate and/or ammonium-silicate matrix starting material is shown in FIG. 9.

The alkali-silicate matrix starting material is supplied to the feeder 36 by means of a feeder 35. The product falls in free descent through the foaming device 37 and, while descending, it is heated, dried and foamed by the energy supplied by microwaves from the generators 29. The finished product drops into the bunker 38 and from said bunker its transport is continued for the purpose of cooling, screening and final finishing.

In the following, the present invention will be described in detail on the basis of preferred examples, without restricting the scope of the invention.

EXAMPLE 1

| | |
|---|---|
| alkali-silicate matrix: | sodium silicate (ratio 2.5), water content: 55.5% by weight, 90% by weight of the recipe addition of 10% by weight of zinc oxide powder and homogenization by stirring concentration by evaporation to a residual water content of <35% by weight rolling so as to form plates of 1–2 mm thickness and concentration by evaporation to a water content of <15% by weight breaking the plates to a grain size of approx. 0.5 mm–5 mm introducing the grains with a filling height of approx. 5 mm into moulds having a cover plate foaming in the microwave oven (laboratory oven, 4 KW, 250° C./60 sec.) foaming to a size of approx. 30 mm |
| product: | foam between cover plates |
| properties: | bulk density 0.07 g/cm³ |
| | pore size 5–500 micron |
| | porosity, open 94% |
| | thermal conductivity 0.05 W/(mK) |
| | compressive strength 0.10 MPa |

EXAMPLE 2

| | |
|---|---|
| alkali-silicate matrix: | sodium silicate Silkalon D (ratio 2.0), spray dried, 60% by weight of the recipe addition of 30% by weight of water (boiling) addition of 10% by weight of zinc oxide powder stirring the mass so as to obtain a homogenized, stiff pulp at temperatures between 50° C.–80° C. rolling the mass out so as to form plates of 1–2 mm thickness and concentration by evaporation to a residual water content of <15% by weight continued as described in example 1. |
| product: | foam between cover plates |
| properties: | bulk density 0.07 g/cm³ |
| | pore size 5–500 micron |
| | porosity, open 93% |
| | thermal conductivity 0.06 W/(mK) |
| | compressive strength 0.12 MPa |
| | moisture resistance losses of 0.3% by weight when kept in water for 15 days |

EXAMPLE 3

| | |
|---|---|
| alkali-silicate matrix: | sodium silicate 58/60 DS (ratio 2.0), 46% by weight water content, 50% by weight of the recipe heating to 50–80° C. addition of Silkalon (ratio 2.0), 40% by weight of the recipe addition of 10% by weight of alumina hydrate homogenizing and rolling out the stiff mass continued as described in example 1. |
| product: | foam between cover plates |
| properties: | foam bulk density 0.065 g/cm³ |
| | pore size 5–300 micron |
| | porosity, open 95% |
| | thermal conductivity 0.05 W/(mK) |
| | compressive strength 0.14 MPa |
| | moisture resistance losses of 0.5% by weight when kept in water for 15 days |

EXAMPLE 4

Corresponds to example 3 with the exception that 5% by weight of SiO₂ fibers have been added.

| | |
|---|---|
| product: | foam between cover plates |
| properties: | foam bulk density 0.065 g/cm³ |

-continued

| | |
|---|---|
| pore size | 5–300 micron |
| porosity, open | 95% |
| thermal conductivity | 0.05 W/(mK) |
| compressive strength | 0.14 MPa |
| moisture resistance | losses of 0.5% by weight when kept in water for 15 days |

EXAMPLE 5

| | |
|---|---|
| alkali-silicate matrix: | sodium silicate 58/60 (ratio 2.0), 60% by weight of the recipe silica sol (Lithosol 1530, $SiO_2$ content 30%), 20% by weight of the recipe, heating to 50–80° C. addition of Silkalon D (ratio 2.0), 20% by weight of the recipe rolling out and afterdrying to a residual water content of 15% by weight continued as described in example 1. |
| product: | foam between cover plates |
| properties: | foam bulk density 0.07 g/cm³ |
| | pore size 5–400 micron |
| | porosity, open 94% |
| | thermal conductivity 0.05 W/(mK) |
| | compressive strength 0.14 MPa |
| | moisture resistance losses of 0.4% by weight when kept in water for 15 days |

EXAMPLE 6

| | |
|---|---|
| alkali-silicate matrix: | sodium silicate 58/60 DS (ratio 2.0), 80% by weight of the recipe heating to 50–80° C. addition of Silkalon D (ratio 2.0) 20% by weight of the recipe addition of zinc oxide powder, 20% by weight of the recipe homogenization and concentration by evaporation to a residual water content of 13% by weight cooling to 20° C., breaking the rigid, brittle mass to a grain size of 0.2–3 mm feeding the granular feed material without any separating agent onto a contiuously circulating belt (glass-fiber fabric or the like) heating in the microwave channel to 200° C. in 60 seconds discharging the granular foam material by suction and screening according to grain size groups |
| product: | granular foam material |
| properties: | grain size 20–30 mm |
| | bulk density 0.05 kg/l |
| | compressive strength 0.015 MPa of the grains |
| | moisture resistance losses of 0.45% by weight when kept in water for 15 days |

What is claimed is:

1. A mineral building and structural material comprising a bulk density of 0.04–0.10 g/cm³ and having a substantially uniformly foamed matrix of partially dewatered alkali-silicate or partially dewatered ammonium-silicate, or mixtures thereof, encompassing an open or closed porous structure, wherein the starting material that is foamed to form the foamed matrix has a water content less than 20% by weight.

2. A mineral building and structural material according to claim 1, wherein said foamed matrix starting material is foamed at temperatures of from 100° C. to 700° C.

3. A material building and structural material according to claim 2, wherein said foam matrix starting material has, without additive substances, a water content of less than 20% by weight but not less than 5% by weight, prior to being foamed.

4. A mineral building and structural material according to claim 1, 2 or 3, consisting of an almost water-free dimensionally stable, closed-pore matrix with enclosed microcavities.

5. A mineral building and structural material according to claim 1 consisting of an almost water-free dimensionally stable, open-pore matrix which consists of a plurality of amorphous or crystalline, irregular hollow microspheres, hollow spherical microshells, microplates or micro-rods defining a matrix which is open to diffusion in the range of from 80% to 95%.

6. A mineral building and structural material according to claim 1 which additionally contains stabilization components of calcium or zinc or magnesium or ammonium or aluminum hydroxide or oxide or natrium compounds or silica or alumina gels or sols or mixtures of these substances.

7. A mineral building a structural material according to claim 1, wherein the ratio of $SiO_2$ to the alkali or ammonium component is respectively greater than 2 in said matrix.

8. A mineral building and structural material according to claim 1, wherein the ratio of $SiO_2$ to the alkali or ammonium component is smaller than 2.5 in said matrix.

9. A mineral building and structural material according to claim 6, 7, or 8, wherein said foamed matrix has the following properties: a thermal conductivity of 0.03–0.10 W/(mK).

10. A mineral building and structural material according to claim 1, 2, 3, 5, 6, 7, or 8, and said material being dimensionally stable up to temperatures of 900° C.

11. A mineral building and structural material according to claim 1, 2, 3, 5, 6, 7, or 8, and said material containing in addition an inorganic or organic fine-grained filler selected from bentonite, gypsum, chalk, lime, crushed rocks, glass powder, cement, alumina, graphite, or organic flour for increasing the strength and the chemical resistance.

12. A mineral building and structural material according to claim 1, wherein said material additionally contains reinforcing fibers having a length of less than 10 mm.

13. A mineral building and structural material according to claim 1, wherein said material additionally contains residual industrial fibers.

14. A mineral building and structural material according to claim 1, 2, 3, 5, 6, 7, or 8, wherein said building and structural material is a non-stabilized or only slightly stabilized packaging material useful as a recyclable packaging material.

15. A mineral building and structural material according to claim 2, wherein said alkali-silicate and/or ammonium-silicate starting material is foamed at temperatures of from 150° C. to 250° C.

16. A mineral building and structural material according to claim 3, wherein said water content is between 15% and 10% by weight.

17. A mineral building and structural material according to claim 5, wherein said diffusion is in the range from 90% to 95%.

18. A mineral building and structural material according to claim 6, wherein said stabilization components are up to 20% by weight.

19. A mineral building and structural material according to claim 12, wherein said reinforcing fibers are composed of glass fibers, ceramic fibers, Skobalith fibers, mineral fibers, carbon fibers, biofibers, or synthetic fibers.

20. A mineral building and structural material according to claim 13, wherein said residual industrial fibers are composed of shearing residues from the production of textiles, carpets, glass-fiber products, or carbon products.

21. A mineral building and structural material according to claim 13, wherein said residual industrial fibers are composed of biofiber residues from the production of wood, cellulose, or other natural fibers.

22. A mineral building and structural material according to claim 12, 19, 20, or 21, and wherein said fibers have a length less than 3 mm.

23. A mineral building and structural material consisting of an almost water-free dimensionally stable, open-pore, substantially uniformly foamed matrix having a bulk density of 0.04–0.10 g/cm$^3$ comprising amorphous or crystalline, irregular hollow microspheres, hollow spherical microshells, microplates, or micro-rods defining a matrix which is open to diffusion in the range of from 80% to 95%.

24. A mineral building and structural material according to claim 23, wherein said diffusion is in the range from 90% to 95%.

25. A mineral building and structural material according to claim 23 comprising a substantially uniformly foamed matrix of alkali-silicate or ammonium-silicate, or mixtures thereof, encompassing an open or closed porous structure wherein the ratio of $SiO_2$ to the alkali or ammonium component is respectively greater than 2 in said matrix.

* * * * *

UNITED STATES PATENT AND TRADEMARK OFFICE
CERTIFICATE OF CORRECTION

PATENT NO. : 6,497,945 B1  Page 1 of 1
DATED : December 24, 2002
INVENTOR(S) : Niedner et al.

It is certified that error appears in the above-identified patent and that said Letters Patent is hereby corrected as shown below:

Column 13,
Line 65, please replace "material" with -- mineral --

Column 14,
Line 30, please replace "building a structural" with -- building and structural --

Signed and Sealed this

Fifth Day of August, 2003

JAMES E. ROGAN
*Director of the United States Patent and Trademark Office*